US005202020A

United States Patent [19]

Desjoyaux et al.

[11] Patent Number: 5,202,020

[45] Date of Patent: Apr. 13, 1993

[54] LIQUID FILTERING DEVICE FOR SWIMMING POOLS IN PARTICULAR

[76] Inventors: Jean L. Desjoyaux; Catherine Desjoyaux épouse Jandros; Pierre L. Desjoyaux, all of R. N. 82. 42480 La Fouillouse, France

[21] Appl. No.: 915,402

[22] Filed: Jul. 20, 1992

Related U.S. Application Data

[63] Continuation of Ser. No. 592,969, Oct. 4, 1990, abandoned.

[30] Foreign Application Priority Data

Oct. 11, 1989 [FR] France ............................ 89 13638

[51] Int. Cl.[5] ............................................ B01D 29/11

[52] U.S. Cl. ................................ 210/169; 210/416.2; 210/446; 210/448; 210/452; 210/484; 4/490

[58] Field of Search ............... 210/169, 443, 445, 446, 210/453, 473, 452, 474, 484, 475, 485, 499, 448, 450, 451; 15/1.7; 4/490; 38/102.2

[56] References Cited

U.S. PATENT DOCUMENTS

| | | | |
|---|---|---|---|
| 2,182,585 | 12/1939 | Green | 210/445 |
| 2,658,625 | 11/1953 | Rafferty | 210/445 |
| 2,792,943 | 5/1957 | Mackintosh | 210/169 |
| 3,419,151 | 12/1968 | Smith et al. | 210/489 |
| 3,442,385 | 5/1969 | Nash | 210/242.1 |
| 4,040,864 | 9/1977 | Steeves | 210/169 |
| 4,126,925 | 11/1978 | Jacuzzi | 210/169 |
| 4,481,117 | 11/1984 | Collins | 210/169 |
| 4,501,659 | 2/1985 | Henk | 210/169 |
| 4,818,398 | 4/1989 | Lott et al. | 210/448 |
| 4,880,531 | 11/1989 | Blake et al. | 210/169 |
| 4,988,437 | 1/1991 | Gefter et al. | 210/445 |

*Primary Examiner*—Peter Hruskoci
*Assistant Examiner*—Robert James Popovics
*Attorney, Agent, or Firm*—Eric P. Schellin

[57] ABSTRACT

The device is made from a textile article (1), made up of at least one layer of non-woven material capable of filtering, the said article is designed to make up a pocket or sleeve, open at one end and closed at the other, this article being mounted inside an open support (2) communicating with the liquid and connected to a liquid suction and delivery system in order for the article (1) to filter the liquid.

4 Claims, 2 Drawing Sheets

6

1

2

4

2a

3

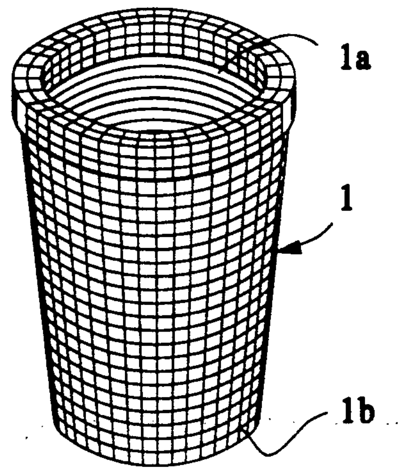
Fig. 1
Fig. 2
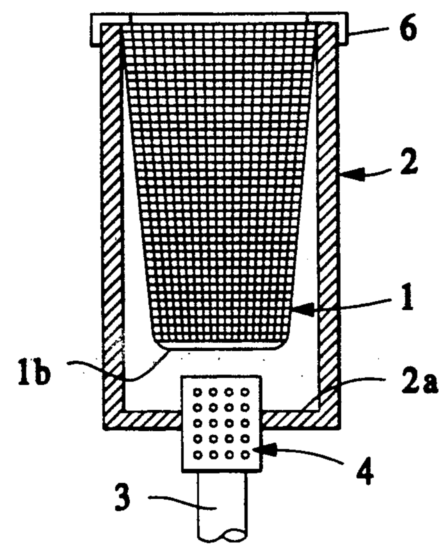
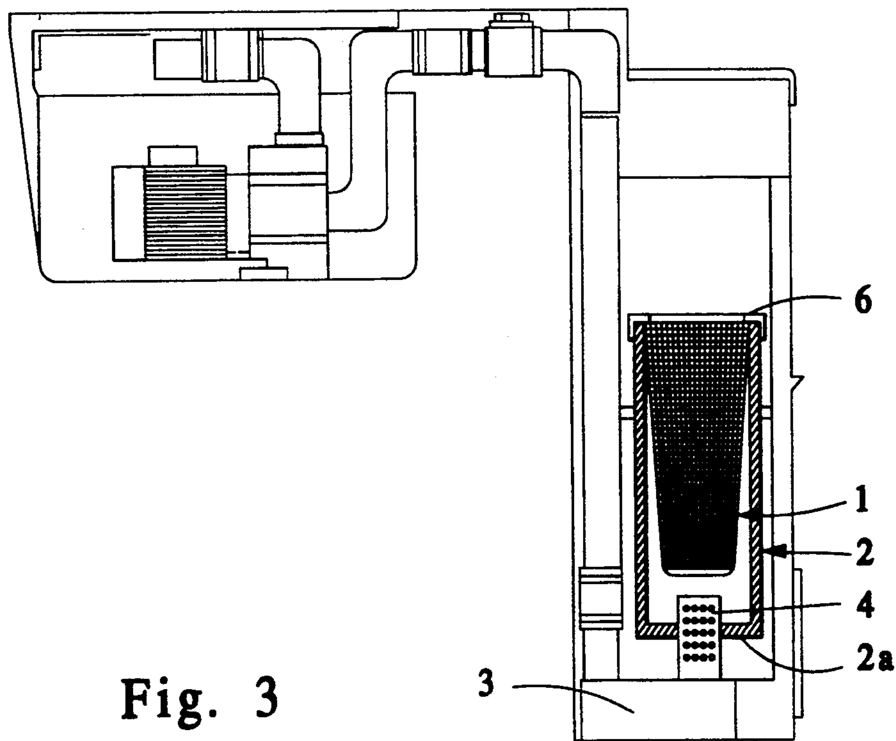
Fig. 3

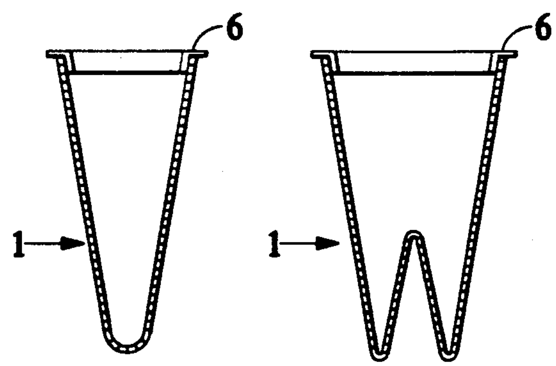
Fig. 4 Fig. 5
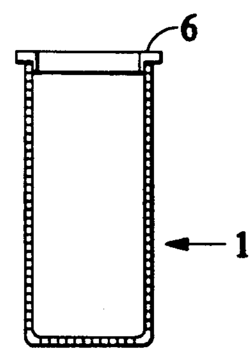
Fig. 6
Fig. 7
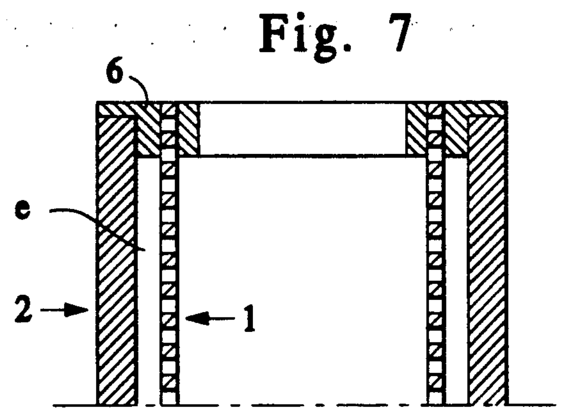
Fig. 8
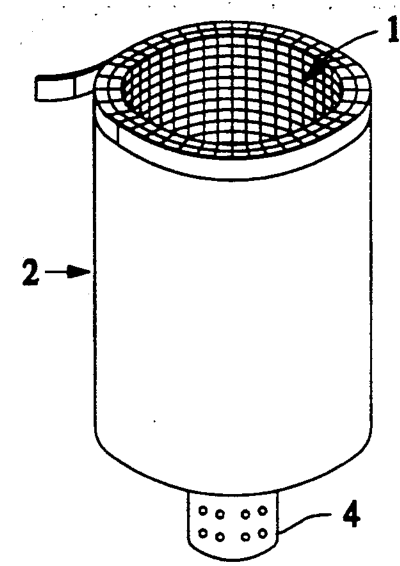
Fig. 9
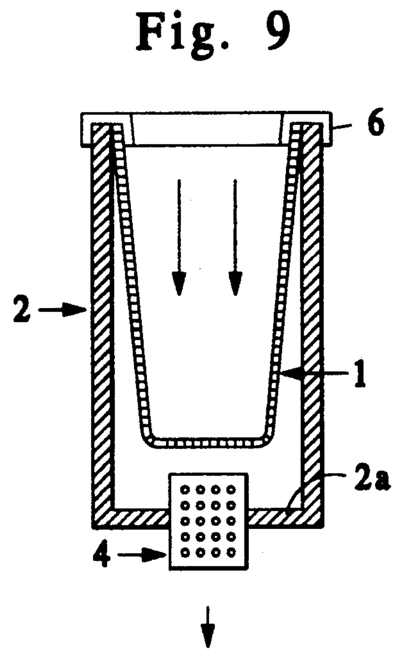
Fig. 10
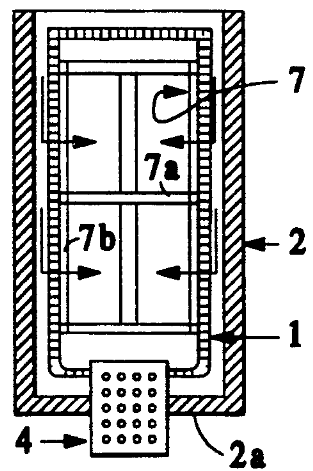

LIQUID FILTERING DEVICE FOR SWIMMING POOLS IN PARTICULAR

This application is a continuation of application Ser. No. 07/592,969 filed Oct. 4, 1990, now abandoned.

The invention relates most particularly to filtering the water of swimming pools or similar products.

BACKGROUND OF THE INVENTION

In general, swimming pool water is filtered by means of a filtering cartridge mounted in combination with the water suction and delivery system. This cartridge is most often made of a corrugated folded polyester canvas arranged radially along the generating lines of a central cylinder. The base of this cartridge communicates with the suction system in particular in order to filter the water which may arrive from the outside of the said cartridge in order to cross its walls. Although the results obtained from a filtering quality point of view may be considered as satisfactory, this type of filter does have certain disadvantages. In fact, the cartridge gets dirty quite quickly and it is difficult to clean. In particular, substantial difficulties arise when removing the cartridge considering it is heavy.

Finally, these filtering cartridges make up a compact with a relatively high cost price and are somewhat fragile. Besides, as indicated, the filtering device is used for swimming pool water. With this in mind, the problem the invention intends to solve is to provide the filtering of liquid in a natural way, by gravity and not under pressure. In fact, pressurized filtering requires specific implementing means which would be totally unsuitable in the case of the application envisaged. For example, the U.S. Pat. No. 4,818,398 may be mentioned as this shows a filtering component arranged in a support which must be fitted with numerous accessories including a cover which is adapted to be completely tight taking the very high pressure forces generated with this type of filtering into consideration.

Furthermore, systems providing gravity filtering have been proposed. However, in this case, considering the means used to obtain satisfactory filtering, a very large filtering surface is required, preventing them from being used for filtering swimming pool water.

SUMMARY OF THE INVENTION

Considering this state of the art and the problem to be solved, the invention consists of the selection of a specific material, its shape and assembly within a support.

In order to solve the problem brought about, i.e. to filter swimming pool water in a natural way by gravity, simply and efficiently, the device is made from a textile article, made up of at least one layer of non-woven material capable of filtering, the said article is designed to make up a pocket or sleeve open at one end and closed at the other, this article being mounted inside an open support communicating with the liquid and connected to a suction and delivery system of the liquid in order for it to filter through the article.

In an advantageous manner, the non-woven filtering article is made of a piece of needle felt. It appears that after having removed the article from its support, it can be very easily washed. In a particularly advantageous manner, the article can be machine washed.

Going from this design, the sleeve may assume the shape of a truncated cone with a cross section decreasing towards its closed end or cylindrical shaped without excluding other profiles.

Regardless of its embodiment, the sleeve is coupled, capable of being dismantled, to the support connected to the suction and delivery system. This support is made up of a cylindrical block in particular, the bottom of which communicates with the suction system. This support block may be open the opposite end to the part connected to the suction and delivery system or closed, depending on the mode of filtering.

Considering the design of the device, it is possible to obtain two different principles of filtering depending on the way the filtering sleeve is positioned inside its support.

According to a first principle, the sleeve is mounted inside the cylindrical support so that the filtering takes place directly through the centre of the sleeve as the liquid arrives straight from the open end of the said sleeve which cooperates with positioning and holding means with respect to the said support.

According to a second principle, the sleeve is mounted inside the cylindrical support, the open part being coupled so as to be tight, to part of the suction and delivery system, the filtering taking place from the outside of the said sleeve.

In this case, the inside of the sleeve has stiffening frames which cooperate with any element likely to provide it with a certain degree of stiffness in order to take the pressure applied by the water into consideration.

In order to solve the problem brought up, i.e. to improve the filtering quality even more, the article is made up of several layers of a non-woven fabric, each layer having a different structure and texture in order to correspond to different degrees of filtration.

BRIEF DESCRIPTION OF THE DRAWINGS

It is also anticipated for the layer(s) of the article to make up a double wall likely to take one or several treatment products.

The invention is now described in more detail accompanied by the drawings in appendix, in which :

FIG. 1 is a perspective view of an embodiment of the filtering article.

FIG. 2 is a schematic section of an example of the article mounted in a support connected to a water suction and delivery system.

FIG. 3 shows the article mounted in an example of filtering unit.

FIGS. 4, 5 and 6 show different non-limitative examples of embodiments of the filtering article.

FIGS. 7 and 8 illustrate different means to hold and position the article inside its support.

FIG. 9 is a section showing the article mounted in its support in the event where the filtering takes place in a coaxial manner straight through the opening of the filtering pocket.

FIG. 10 is a view similar to FIG. 9 in the event where the filtering takes place from the outside of the filtering pocket, the support being open.

DETAILED DESCRIPTION OF THE INVENTION

According to the invention, the filtering device is made from an article (1) made up of at least one layer of a non-woven material capable of filtering. In an advantageous manner, the article (1) is made of a piece of needle felt, of any known and suitable means, the texture of which is determined in function of the quality of filtering to be obtained.

This filtering article (1) is suitably mounted in combination with a support (2) connected to a suction and delivery system (3) of the liquid, including water, so as to retain the impurities and other particles which may be contained in the water as and when it passes through the non-woven material (1).

In an advantageous manner, the filtering article (1) is designed to make up a pocket or sleeve, open at one end (1*a*) and closed at the other (1*b*). Going by this design, different embodiments can come within the scope of the invention. In a preferred manner, as shown in FIG. 1, the filtering pocket (1) assumes the shape of a truncated cone degreasing towards its closed end (1*b*). FIGS. 4, 5 and 6 show other non-limitative examples of shapes the filtering pocket (1) may assume. This pocket may be cylindrical (FIG. 6) in particular.

FIG. 7 clearly shows the embodiment where the open end portion of the filter is sandwiched between a portion of the support means and the attaching means.

The article may be configured by any known and suitable means likely to give it a tubular shape with one closed end.

As shown in FIG. 2 in particular, the filtering pocket (1), is arranged inside the support (2), in the form of a cylinder in particular, making up a well. The bottom (2*a*) of this cylinder (2) is coupled, in a known manner, for example, by a strainer (4), to a water suction and delivery system (3). Regardless of the embodiment of the filtering pocket, this is arranged inside the support (2) capable of being removed.

Considering the design of the filtering sleeve and in function of its positioning inside the support (2), the filtering may take place according to two different principles (FIGS. 9 and 10).

In FIG. 9, the sleeve (1) is mounted inside the cylindrical support (2) so that the filtering takes place coaxially through the centre of the said sleeve. The water arrives straight from the open end (1*a*) of the sleeve so as to be discharged through the strainer (4) after having been filtered by the sleeve (1).

With this mode of filtering, the open end of the sleeve cooperates with positioning and holding means (6) with respect to the support cylinder (2). For example, the filtering pocket has directly or in a built up manner to its opening (1*a*) a collar (6) designed to be applied against the top peripheral edge of the support (2). In an advantageous manner, this collar (6) is fixed to the sleeve in a build up manner with suitable means so as to be easily dismantled. For example, this collar (6) may be fixed by a system of complementary—male and female—tapes of the self-gripping type, known under the "VELCRO" mark or fixed by means of a strap.

In the event where the filtering pocket is a cylindrical shape, the support collar has a cross section determined so as to hold the walls of the said pocket and support (1) according to a constant or practically constant interval limiting an annular space (e) so as not to jeapardize the filtering qualities.

In FIG. 10, the sleeve (1) is mounted inside the support so that the filtering takes place from the outside. With this in mind, the open part (1*a*) of the sleeve (1) is coupled so as to be tight, to part of the suction and delivery system (3) including the strainer (4). The water arrives therefore in the annular space (e) then crosses the wall of the filter (1) so as to be filtered then discharged through the strainer (4). With this mode of filtering, considering the substantial pressure forces applied against the filtering pocket (1) by the water, it has a frame (7) inside, likely to made it stiff in order to avoid the walls from being deformed. For example, this frame (7) can be made up of a series of superimposed rings (7*a*) braced by rectilinear vertical components (7*b*). Obviously, the shapes and dimensions of the rings of the frame are directly connected to the shape given to the filtering pocket. If designed in this way, this stiffening frame is easily dismantled.

The article (1) can be advantageously made of several layers of non-woven material as previously defined, a piece of needle felt. Besides, every layer may have a different structure in order to correspond to different degrees of filtration. Similarly, in another embodiment, the layer(s) of the article can make up a double wall likely to take one or several treatment products.

The advantages are made well apparent from the description and the following is highlighted in particular:

the low cost price the easy maintenance of the filter that is a piece of needle felt which can be easily cleaned, including machine washed easily installation and removal of filtering pocket inside its support quality and output of the filtering obtained which takes place in a natural manner by gravity.

We claim:

1. A gravity flow swimming pool filter device comprising a filter of nonwoven textile material, said filter defining substantially of funnel configuration and being opened at one water receiving first end and closed at its opposite second end, said second end being truncated, said filter being coaxially mounted internally at its first end in a cylindrical vertically disposed support means, said support means defining a housing open at a first end and a constricted drain opening at a second end, and a removable circular attaching means positioned internally of said first end of said filter to secure the water receiving first end of said filter internally of the first end of the support means wherein a portion of said first end of said filter is sandwiched between said circular attaching means and said first end of said support means.

2. The filter device according to claim 1 wherein the filter has a strengthening frame.

3. The filter device according to claim 1 wherein the filter is composed of several layers of a non-woven textile layers.

4. The filter device according to claim 1 wherein the filter is composed of several layers of different non-woven textile layers.

* * * * *